US011332147B2

(12) United States Patent
Shiga et al.

(10) Patent No.: US 11,332,147 B2
(45) Date of Patent: May 17, 2022

(54) DRIVING EVALUATION APPARATUS, DRIVING EVALUATION SYSTEM, AND DRIVING EVALUATION METHOD

(71) Applicant: TOYOTA JIDOSHA KABUSHIKI KAISHA, Toyota (JP)

(72) Inventors: Takahiro Shiga, Chiryu (JP); Mami Kato, Toyota (JP); Masato Endo, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 311 days.

(21) Appl. No.: 16/539,675

(22) Filed: Aug. 13, 2019

(65) Prior Publication Data

US 2020/0079383 A1    Mar. 12, 2020

(30) Foreign Application Priority Data

Sep. 12, 2018    (JP) .............................. JP2018-170749

(51) Int. Cl.
| | |
|---|---|
| *B60W 40/08* | (2012.01) |
| *G05D 1/00* | (2006.01) |
| *G10L 25/63* | (2013.01) |
| *G06V 20/59* | (2022.01) |

(Continued)

(52) U.S. Cl.
CPC .......... *B60W 40/08* (2013.01); *G05D 1/0088* (2013.01); *G06V 20/59* (2022.01); *G06V 40/174* (2022.01); *G10L 25/63* (2013.01); *B60W 50/0098* (2013.01); *B60W 2420/42* (2013.01); *B60W 2420/54* (2013.01); *B60W 2520/105* (2013.01);

(Continued)

(58) Field of Classification Search
CPC ...... B60W 40/08; B60W 40/10; B60W 60/00; B60W 60/0013; B60W 60/30; G06Q 10/06393; G05D 1/0088; G06K 9/00302; G06K 9/00832; G10L 25/63
See application file for complete search history.

(56) References Cited

U.S. PATENT DOCUMENTS

| 10,562,534 B2* | 2/2020 | Minegishi | ............. B60W 50/14 |
| 10,744,967 B2* | 8/2020 | Lee | ................... B60H 1/00357 |

(Continued)

FOREIGN PATENT DOCUMENTS

| CN | 107856672 A | * | 3/2018 | |
| CN | 109843681 A | * | 6/2019 | ........... G05D 1/0088 |

(Continued)

OTHER PUBLICATIONS

Toyota Motor Corporation; "Mobility Service-specific EV 'e-Palette Concept;'" Retrieved Aug. 31, 2018; <URL: https://newsroom.toyota.co.jp/jp/corporate/20508200.html>.

*Primary Examiner* — Rachid Bendidi
(74) *Attorney, Agent, or Firm* — Oliff PLC

(57) ABSTRACT

A driving evaluation apparatus includes a processor configured to determine, based on information about facial expressions or behaviors of one or more passengers riding in a vehicle that is under automatic driving control, whether or not the passenger has displayed a facial expression or behavior indicating a specific feeling, and estimate ride comfort of the vehicle felt by the passenger in accordance with a determination result; and evaluate the driving of the vehicle that is under the automatic driving control, based on an estimation result of the ride comfort.

16 Claims, 8 Drawing Sheets

(51) Int. Cl.
   *G06V 40/16* (2022.01)
   *B60W 50/00* (2006.01)
(52) U.S. Cl.
   CPC ..... *B60W 2540/21* (2020.02); *B60W 2540/22* (2013.01); *G05D 2201/0213* (2013.01)

(56) References Cited

U.S. PATENT DOCUMENTS

| | | | | |
|---|---|---|---|---|
| 2016/0378112 | A1* | 12/2016 | Ljubuncic | G06K 9/00845 701/45 |
| 2018/0281810 | A1* | 10/2018 | Tochioka | B60W 40/09 |
| 2019/0064800 | A1* | 2/2019 | Frazzoli | G05D 1/0223 |
| 2021/0016805 | A1* | 1/2021 | Oba | B60W 60/0057 |

FOREIGN PATENT DOCUMENTS

| | | | | |
|---|---|---|---|---|
| DE | 112011103059 T5 * | 6/2013 | ............ | G06F 17/00 |
| JP | 2006-8098 A | 1/2006 | | |
| JP | 2009-227075 A | 10/2009 | | |
| JP | 2010247804 A * | 11/2010 | | |
| JP | 2016-007989 A | 1/2016 | | |
| JP | 2016137203 A * | 8/2016 | | |
| JP | 2017-49629 A | 3/2017 | | |
| JP | 2017-211703 A | 11/2017 | | |
| JP | WO2018084170 A1 * | 2/2019 | ......... | G06K 9/00355 |
| JP | WO2018211583 A1 * | 6/2019 | ............... | G08G 1/09 |
| KR | 20140014281 A * | 2/2014 | ............. | B61F 5/245 |

* cited by examiner the ride comfort of the vehicle that is under the

DRIVING EVALUATION APPARATUS, DRIVING EVALUATION SYSTEM, AND DRIVING EVALUATION METHOD

FIELD

The present invention relates to a driving evaluation apparatus, a driving evaluation system, and a driving evaluation method that evaluate the driving of a vehicle that is under automatic driving control.

BACKGROUND

In conventional vehicles driven by drivers, the drivers' driving techniques have profound effects on the ride comfort of the vehicles. Accordingly, for example, Japanese Patent Publication (Kokai) No. 2006-8098 proposes controlling the inclination and the like of a seat of a vehicle, in accordance with a seated condition of a passenger, so as to reduce the effect of acceleration caused by accelerator, brake, or steering wheel operation of a driver, for the purpose of improving the ride comfort of the vehicle felt by the passenger.

In the technique described in Japanese Patent Publication (Kokai) No. 2006-8098, a passenger condition detector detects the passenger's condition from the outputs of a vehicle-mounted camera and a seat sensor. A seat controller controls a seat position adjustment mechanism, a backrest angle adjustment mechanism, a lumbar support mechanism, a cushion control mechanism, and a pendulum mechanism based on the passenger's conditions and facial expressions or behaviors, to make the seat comfortable.

In automatic driving vehicles that are driven by self control, the performance and function of automatic driving control have profound effects on ride comfort of the vehicles. The performance and function of the automatic driving control can be easily updated, as compared with the driving techniques of human drivers, based on evaluations of the driving of the vehicles, in order to further improve the ride comfort of the vehicles felt by passengers.

For example, a non-patent literature (TOYOTA MOTOR CORPORATION, Mobility Service-specific EV "e-Palette Concept" [retrieved on Aug. 31, 2018], Internet <URL: https://newsroom.toyota.co.jp/jp/corporate/20508200.html>) describes an automatic driving vehicle that allows a manufacturer other than the maker of the vehicle to develop an automatic driving kit including vehicle control software and the like, by disclosing a vehicle control I/F (interface) for controlling the driving of the vehicle. In the automatic driving vehicle described in the non-patent literature, the automatic driving kit is configured so that the performance and function of the automatic driving control can be updated. The performance and function of the automatic driving control can be thereby optimized in conformance with Mobility-as-a-Service (MaaS).

SUMMARY

However, in automatic driving vehicles in which drivers and crews are absent, it is difficult to request evaluations of the ride comfort of the vehicles from passengers. Therefore, a technology for automatically and appropriately evaluating the driving of the vehicle that is under automatic driving control is demanded.

The present invention aims to provide a driving evaluation apparatus that can automatically and appropriately evaluate the driving of a vehicle that is under automatic driving control.

A driving evaluation apparatus according to an embodiment of the present invention includes a driving evaluation apparatus comprising a processor configured to determine, based on information about facial expressions or behaviors of one or more passengers riding in a vehicle that is under automatic driving control, whether or not the passenger has displayed a facial expression or behavior indicating a specific feeling, and estimate ride comfort of the vehicle felt by the passenger in accordance with a determination result; and evaluate the driving of the vehicle that is under the automatic driving control, based on an estimation result of the ride comfort. Therefore, it is possible to provide a driving evaluation apparatus that can automatically and appropriately evaluate the driving of the vehicle that is under the automatic driving control.

In the driving evaluation apparatus, the processor preferably estimates the ride comfort of the vehicle felt by the passenger, based on the facial expressions or behavior of the passenger when the absolute value of acceleration, velocity, or angular velocity of the vehicle exceeds a predetermined threshold value. Therefore, it is possible to evaluate control over a driving condition of the vehicle, in which the performance difference or functional difference of an automatic driving control module is particularly apparent, so the performance and function thereof can be easily updated.

In the driving evaluation apparatus, whenever the processor receives the information about the facial expressions or behavior of the passenger, the processor preferably determines whether or not the passenger has displayed the facial expression or behavior indicating the specific feeling based on the received information. When the processor determines that the passenger has displayed the facial expression or behavior indicating the specific feeling, the processor preferably estimates the ride comfort of the vehicle felt by the passenger as negative. The processor preferably evaluates the driving of the vehicle that is under the automatic driving control, based on the number of times the ride comfort of the vehicle is estimated as negative.

In particular, the information about the facial expressions or behavior of the passenger is preferably a video of the passenger captured by an imaging device of the vehicle when the absolute value of acceleration, velocity, or angular velocity of the vehicle exceeds a predetermined threshold value. When the processor determines that the passenger in the video has displayed the facial expression or behavior indicating the specific feeling, the processor preferably estimates the ride comfort of the vehicle felt by the passenger as negative. Therefore, the ride comfort of the vehicle felt by the passenger can be estimated based on the video of the passenger.

The information about the facial expressions or behavior of the passenger is preferably a voice of the passenger recorded by a sound collector of the vehicle when the absolute value of acceleration, velocity, or angular velocity of the vehicle exceeds a predetermined threshold value. When the voice includes a predetermined phrase representing a behavior indicating the specific feeling, or when the strength of the voice exceeds a predetermined threshold value, the processor preferably estimates the ride comfort of the vehicle felt by the passenger as negative. Therefore, the ride comfort of the vehicle felt by the passenger can be estimated based on the voice of the passenger.

In the driving evaluation apparatus, when the ride comfort of the vehicle is estimated as negative for a predetermined number or more of the passengers riding in the vehicle, the processor preferably estimates the ride comfort of the vehicle as negative. Therefore, it is possible to improve accuracy of evaluation of the driving of the vehicle that is under the automatic driving control.

In the driving evaluation apparatus, it is preferable that the processor not estimate the ride comfort of the vehicle felt by the passenger based on the facial expressions or behavior of the passenger when the absolute value of the acceleration, velocity, or angular velocity of the vehicle exceeds the predetermined threshold value, as a result of the automatic driving control to avoid danger. Therefore, it is possible to further improve the accuracy of evaluation of the driving of the vehicle that is under the automatic driving control.

The driving evaluation apparatus preferably further includes a memory. The processor preferably stores an evaluation result of the driving of the vehicle by the automatic driving control module, which is installed in the vehicle and which has automatic driving control over the vehicle, and information about the type or version of the automatic driving control module, in the memory in association with each other. Therefore, the driving can be evaluated on a type-by-type or version-by-version basis of the automatic driving control module, whereby the performance and function thereof can be easily updated.

A driving evaluation apparatus according to another embodiment of the present invention is configured as a server that receives information about facial expressions or behaviors of a passenger from a vehicle, in which a capture device for capturing the information about the facial expressions or behavior of the passenger is installed, through a network. Therefore, a server that can automatically and appropriately evaluate the driving of the vehicle that is under automatic driving control can be provided.

A driving evaluation apparatus according to yet another embodiment of the present invention is configured as a vehicle-mounted device installed in a vehicle, together with a capture device for capturing information about facial expressions or behaviors of a passenger. Therefore, a vehicle-mounted device that can automatically and appropriately evaluate the driving of the vehicle that is under automatic driving control can be provided.

A driving evaluation system according to an embodiment of the present invention has a server and a vehicle-mounted device that are communicatably connected to each other through a network. The driving evaluation system includes the vehicle-mounted device that collects information about facial expressions or behaviors of a passenger riding in a vehicle that is under automatic driving control, from a capture device for capturing the information about the facial expressions or behavior of the passenger; and the server that determines whether or not the passenger has displayed a facial expression or behavior indicating a specific feeling, based on the information about the facial expressions or behavior of the passenger received from the vehicle-mounted device, and that estimates ride comfort of the vehicle felt by the passenger in accordance with a determination result, and that evaluates the driving of the vehicle that is under the automatic driving control, based on an estimation result of the ride comfort. Therefore, a driving evaluation system that can automatically and appropriately evaluate the driving of the vehicle that is under the automatic driving control can be provided.

A driving evaluation method according to an embodiment of the present invention includes the steps of, based on information about facial expressions or behaviors of one or more passengers riding in a vehicle that is under automatic driving control, determining whether or not the passenger has displayed a facial expression or behavior indicating a specific feeling, and estimating ride comfort of the vehicle felt by the passenger in accordance with a determination result; and evaluating the driving of the vehicle that is under the automatic driving control, based on an estimation result of the ride comfort. Therefore, a driving evaluation method that can automatically and appropriately evaluate the driving of the vehicle that is under the automatic driving control can be provided.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

DESCRIPTION OF EMBODIMENTS

Figure 1:
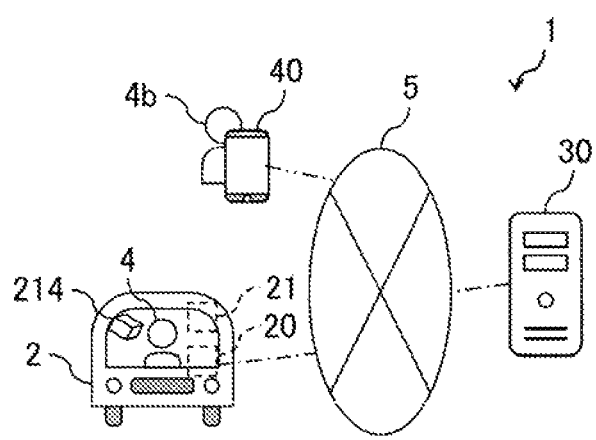
FIG. 1 is a drawing showing an example of the configuration of a driving evaluation system according to a first embodiment.

It is known that ride comfort of vehicles felt by passengers is largely affected by whether the passengers are accustomed to temporal variations of acceleration, in addition to the magnitude of acceleration caused by accelerator, brake, or steering wheel operation. Thus, the driving of vehicles that are under automatic driving control is preferably evaluated based on the ride comfort of the vehicles actually felt by the passengers.

However, in automatic driving vehicles in which drivers and crews are absent, it is difficult to request evaluations of the ride comfort of the vehicles from passengers. Even if it were possible to request evaluations from the passengers, evaluation may be burdensome to the busy passengers. If the passengers roughly make the evaluations, the accuracy of the vehicle driving evaluations may be reduced.

Therefore, a driving evaluation apparatus according an embodiment of the present invention estimates the ride comfort of a vehicle felt by a passenger, based on information about facial expressions or behavior of the passenger who is riding in the vehicle, for example, a video of the passenger captured by an in-vehicle camera. The driving evaluation apparatus evaluates the driving of the vehicle that is under automatic driving control, based on a ride comfort estimation result.

Therefore, according to the present invention, the driving of the vehicle that is under the automatic driving control is automatically and appropriately evaluated based on the ride comfort of the vehicle actually felt by the passenger, without burdening the busy passengers.

Preferred embodiments of the present invention will be described below with reference to the drawings. Note that, the present invention is not limited to the following embodiments, but may be appropriately modified without departing from the gist thereof. In the drawings, components having the same or similar functions have been assigned the same reference numerals, and descriptions thereof may be omitted or simplified.

[First Embodiment] FIG. 1 is a drawing showing an example of the configuration of a driving evaluation system 1 according to a first embodiment. The driving evaluation system 1 according to the present embodiment has a vehicle-mounted device 20, a server 30, and a mobile terminal 40. The server 30 of the present embodiment is an example of the driving evaluation apparatus.

A vehicle 2 illustrated in FIG. 1 is an automatic driving vehicle that offers mobility services such as a taxi, bus, or ride share. A passenger 4 using the mobility service rides in the vehicle 2. The vehicle-mounted device 20 and an automatic driving control module 21 are installed in the vehicle 2.

The vehicle-mounted device 20 collects, for example, a video of the passenger 4 captured by an in-vehicle camera 214, as information about facial expressions or behavior of the passenger 4 to evaluate the driving of the vehicle 2 that is under automatic driving control, and sends the video to the server 30. The automatic driving control module 21 automatically controls the driving of the vehicle 2. The automatic driving control module 21 is configured so that the performance and function of the automatic driving control can be updated.

The server 30 estimates the ride comfort of the vehicle 2 felt by the passenger 4, based on the information about the facial expressions or behavior of the passenger 4 received from the vehicle-mounted device 20, and evaluates the driving of the vehicle 2 that is under the automatic driving control by the automatic driving control module 21, based on a ride comfort estimation result.

A user 4b who wishes to use the mobility service offered by the vehicle 2 operates the mobile terminal 40, such as a cellular phone or a tablet computer, carried by the user 4b, in order to request the dispatch of the vehicle 2 from the server 30.

The vehicle-mounted device 20, the server 30, and the mobile terminal 40 can communicate with each other through a network 5, which is composed of optical communication lines or the like. The server 30 is connected to the network 5 through, for example, a gateway or the like (not illustrated). The vehicle-mounted device 20 and the mobile terminal 40 are connected to the network 5 through, for example, wireless base stations (not illustrated).

Figure 2:
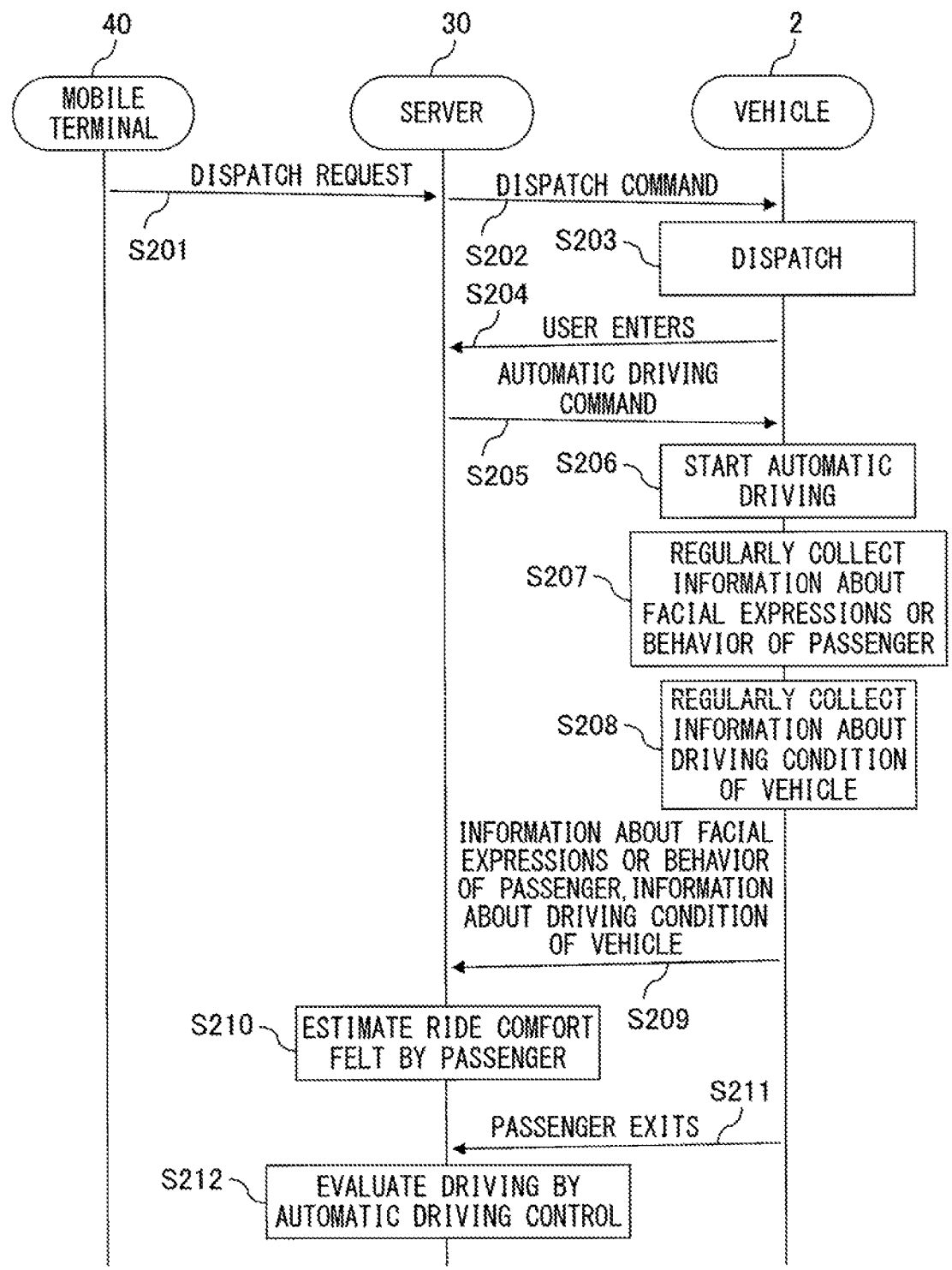
FIG. 2 is a sequential diagram showing an example of a driving evaluation process of a vehicle that is under automatic driving control, in the driving evaluation system according to the first embodiment.

FIG. 2 is a sequential diagram showing an example of a driving evaluation process of the vehicle 2 that is under the automatic driving control, in the driving evaluation system 1 according to the first embodiment. In the sequential diagram of FIG. 2, the server 30, the vehicle 2, and the mobile terminal 40 communicate through the network 5.

The server 30 receives information about a present location and a destination of the user 4b, together with a dispatch request, from the mobile terminal 40 of the user 4b who wishes to use the mobility service (step S201). The information about the present location and the destination of the user 4b is designated by, for example, a facility name, an address, or a combination of latitude and longitude.

The server 30 retrieves vehicles 2 that are present within a certain distance from the present location of the user 4b, and selects an available vehicle 2 from the retrieved at least one vehicle 2. The server 30 sends a dispatch command to the vehicle 2 to move the vehicle 2 to the present location of the user 4b (step S202).

Note that, when the vehicles 2 offer a ride sharing service, other passengers 4 may already be riding in the vehicles 2. In this case, for example, the server 30 may select, from the retrieved at least one vehicle 2, a vehicle 2 containing other passengers 4 who are travelling to a destination which is in the same direction as the destination of the user 4b.

Upon receiving the dispatch command from the server 30, the automatic driving control module 21 of the vehicle 2 moves the vehicle 2 to the present location of the user 4b, which is received together with the dispatch command (step S203).

When the user 4b enters the dispatched vehicle 2, the automatic driving control module 21 of the vehicle 2 detects the entry of the user 4b into the vehicle 2 by, for example, the in-vehicle camera 214, and informs the server 30 as such (step S204). The user 4b himself or herself, instead of the automatic driving control module 21 of the vehicle 2, may inform the server 30 of the entry of the user 4b into the vehicle 2 by operation of the mobile terminal 40.

Upon receiving confirmation that the user 4b has entered the vehicle 2, the server 30 generates a driving route from the present location of the vehicle 2 to the destination of the user 4b. Alternatively, for example, a car navigation system of the vehicle 2 may generate a driving route based on information about the present location and the destination of the user 4b, which is received together with the dispatch command.

When the vehicle 2 offers ride share service, a driving route from the present location of the vehicle 2 to the nearest destination from among the destinations of the other passengers 4 already riding in the vehicle 2 and the destination of the user 4b is generated.

The server 30 sends the driving route to the automatic driving control module 21 of the vehicle 2, as necessary, and commands the automatic driving control module 21 of the vehicle 2 to perform automatic driving along the driving route (step S205). The automatic driving control module 21 of the vehicle 2 thereby starts the automatic driving of the vehicle 2 to the destination along the driving route (step S206).

The user 4b who is riding in the vehicle 2 is hereinafter referred to as a passenger 4. While the automatic driving control module 21 is driving the vehicle 2 automatically, the vehicle-mounted device 20 of the vehicle 2 regularly collects information about the facial expressions or behavior of the passenger 4 who is riding in the vehicle 2 (step S207). The information about the facial expressions or behavior of the passenger 4 is, for example, a video of the passenger 4 captured by the in-vehicle camera 214, or the voice of the passenger 4 recorded by a vehicle-mounted microphone.

While the vehicle 2 is being automatically driven, the vehicle-mounted device 20 regularly collects information about a driving condition of the vehicle 2, including the acceleration of the vehicle 2 caused by control of an accelerator, brake, or steering wheel by the automatic driving control module 21 (step S208). The information about the driving condition of the vehicle 2 may further include information about the velocity, angular velocity, or the like of the vehicle 2.

Note that, in steps S207 and S208, a process for collecting the information about the facial expressions or behavior of the passenger 4 and a process for collecting the information about the driving condition of the vehicle 2 can be performed in parallel.

Next, the vehicle-mounted device 20 of the vehicle 2 sends the collected information about the facial expressions or behavior of the passenger 4 and the information about the driving condition of the vehicle 2 to the server 30 (step S209). The vehicle-mounted device 20 may send the information about the driving condition of the vehicle 2 to the server 30 as soon as it is collected. Alternatively, the vehicle-mounted device 20 may temporarily hold the information in a memory or the like, and thereafter collectively send the information to the server 30.

Next, the server 30 estimates the ride comfort of the vehicle 2 felt by the passenger 4, based on the information about the facial expressions or behaviors of the one or more passengers 4 while the vehicle 2 from which the information is received is in a predetermined driving condition (step S210). The information about the driving condition of the vehicle 2 is, for example, the acceleration, velocity, or angular velocity of the vehicle 2 under the automatic driving control. The predetermined driving condition is, for example, a condition in which the absolute value of the acceleration, velocity, or angular velocity exceeds a predetermined threshold value. In particular, when the information about the driving condition is acceleration, the predetermined driving condition is a condition in which the absolute value of the acceleration of the vehicle 2 in the direction of travel or a lateral direction exceeds a predetermined threshold value. A specific method for estimating the ride comfort of the vehicle 2 based on the information about the facial expressions or behavior of the passenger 4 will be described later with reference to FIG. 7.

Therefore, it is possible to evaluate control over the driving condition of the vehicle 2, in which the performance difference or functional difference of the automatic driving control module 21 is particularly apparent, whereby the performance and function thereof can be easily updated.

The server 30 may estimate the ride comfort of the vehicle 2 felt by the passenger 4 as soon as the information from the vehicle-mounted device 20 of the vehicle 2 is received. Alternatively, the server 30 may temporarily hold the received information in a memory or the like, and thereafter collectively estimate the ride comfort of the vehicle 2 felt by the passenger 4.

In step S209, the vehicle-mounted device 20 of the vehicle 2 may send only the information about the facial expressions or behavior of the passenger 4 collected in a certain period, including the time during which the vehicle 2 was in the predetermined driving condition, to the server 30, whereby the amount of information sent from the vehicle-mounted device 20 to the server 30 is reduced. In this case, the sending of the information about the driving condition of the vehicle 2 to the server 30 by the vehicle-mounted device 20 of the vehicle 2 may be omitted.

After the vehicle 2 has arrived at the destination, the automatic driving control module 21 of the vehicle 2 detects that the passenger 4 has exited the vehicle 2 by, for example, the in-vehicle camera 214, and informs the server 30 as such (step S211). The passenger 4 himself or herself, instead of the automatic driving control module 21 of the vehicle 2, may inform the server 30 that he or she has exited the vehicle 2, by operation of the mobile terminal 40.

Upon receiving information that the passenger 4 has exited the vehicle 2, the server 30 evaluates the driving of the vehicle 2 that is under the automatic driving control, based on the estimated ride comfort felt by the passenger 4 (step S212). A specific method for evaluating the driving of the vehicle 2 based on the ride comfort felt by the passenger 4 will be described later with reference to FIG. 9.

Figure 3:
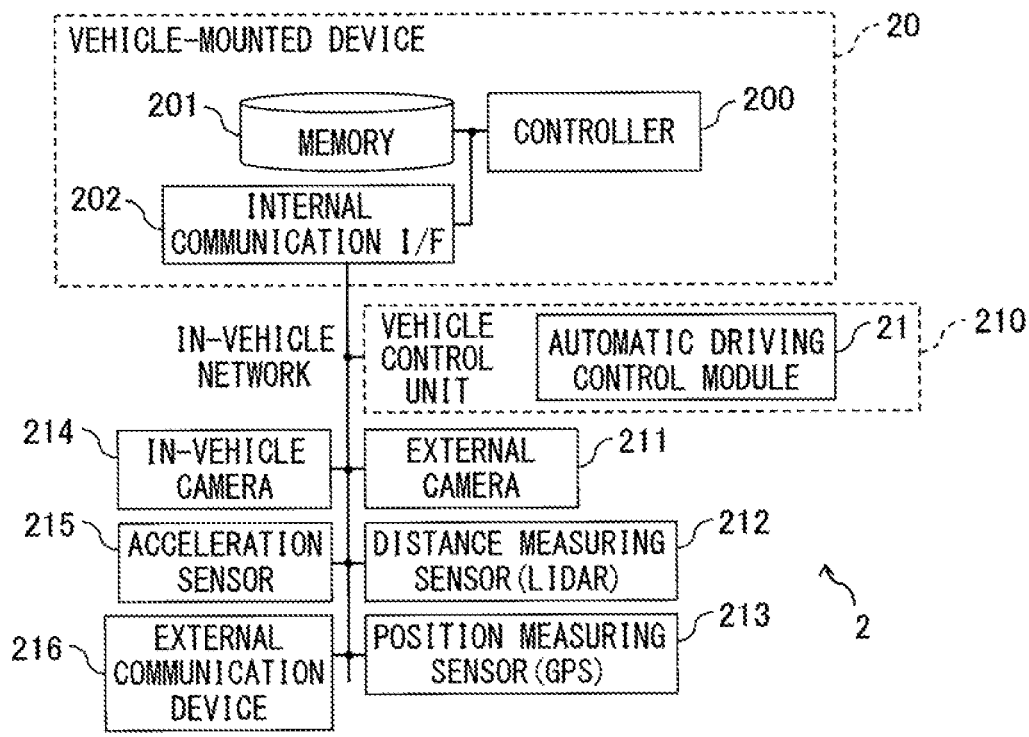
FIG. 3 is a hardware configuration diagram of the vehicle according to the first embodiment.

FIG. 3 is a hardware configuration diagram of the vehicle 2 according to the first embodiment. The vehicle 2 has the vehicle-mounted device 20, a vehicle control unit 210, an external camera 211, a distance measuring sensor 212, a position measuring sensor 213, the in-vehicle camera 214, an acceleration sensor 215, and an external communication device 216 that are connected to each other through an in-vehicle network. The vehicle 2 further has the automatic driving control module 21. The in-vehicle network is, for example, a network that is in conformity with CAN (controller area network) standards.

The vehicle-mounted device 20 collects the information about the facial expressions or behavior of the passenger 4 who is riding in the vehicle 2, and sends the information to the server 30. The vehicle-mounted device 20 has a controller 200, a memory 201, and an internal communication interface (I/F) 202 that are connected to each other through signal lines.

The controller 200 is one or more processors and peripheral circuits thereof that execute computer programs for control and calculation in the vehicle-mounted device 20.

The memory 201 has a recording medium such as an HDD (hard disk drive), an optical recording medium, or a semiconductor memory, and stores the computer programs executed by the controller 200. The memory 201 stores data that is received from other vehicle-mounted devices of the vehicle 2 through the in-vehicle network, data generated by the controller 200, and the like.

The internal communication I/F 202 is a communication I/F circuit through which the vehicle-mounted device 20 communicates with other vehicle-mounted devices of the vehicle 2 via the in-vehicle network.

The vehicle control unit 210 has at least one automatic driving control module 21, and controls the accelerator, brake, and steering wheel of the vehicle 2 in accordance with control signals outputted from the automatic driving control module 21. The vehicle control unit 210 transfers signals outputted from the external camera 211, distance measuring sensor 212, position measuring sensor 213, and acceleration sensor 215, which are described later, to the automatic driving control module 21.

The automatic driving control module 21 automatically controls the driving of the vehicle 2. The automatic driving control module 21 is configured so that, for example, the performance and function of automatic driving control can be updated. Therefore, the performance and function of the automatic driving control module 21 can be optimized in accordance with the mobility service offered by the vehicle 2. Note that, in applications in which improvements in the performance and function of the automatic driving control module 21 are not particularly necessary, the automatic driving control module 21 need not necessarily be configured so to be updatable.

The external camera 211 captures and outputs a video of the surroundings of the vehicle 2. The video captured by the external camera 211 is used by the automatic driving control module 21 to automatically control the driving of the vehicle 2. The external camera 211 is disposed near a windshield of the vehicle 2, for example, with an imaging surface thereof facing toward the outside such that people or objects around the vehicle 2 are captured clearly.

The distance measuring sensor 212 measures and outputs distances to objects that are present ahead the vehicle 2 on an orientation basis. Distance information measured by the distance measuring sensor 212 is used, in the same manner, by the automatic driving control module 21 to automatically control the driving of the vehicle 2. The distance measuring sensor 212 is, for example, a LIDAR (light detection and ranging) installed in the vehicle 2.

The position measuring sensor 213 generates position information that represents the present location of the vehicle 2, and outputs the position information to the vehicle-mounted device 20. The position information generated by the position measuring sensor 213 is used by the automatic driving control module 21 to automatically control the driving of the vehicle 2, and is also transmitted to the server 30 through the network 5 so that the present location of the vehicle 2 can be understood by the server 30. The position measuring sensor 213 is, for example, a GPS (global positioning system) of the car navigation system installed in the vehicle 2.

The in-vehicle camera 214 is an example of an imaging device or a capture device, and captures the video of the passenger 4 riding in the vehicle 2 and outputs the video to the vehicle-mounted device 20. The video of the passenger 4 captured by the in-vehicle camera 214 is used as an example of the information about the facial expressions or behavior of the passenger 4 to estimate the ride comfort felt by the passenger 4. To clearly capture the facial expressions or behaviors of the riding passenger 4, the in-vehicle camera 214 is disposed, for example, on the ceiling in front of the seat on which the passenger 4 is sitting, the rear surface of the seat in front of the passenger's seat, or the like.

The acceleration sensor 215 measures and outputs an acceleration generated by the vehicle 2. The acceleration measured by the acceleration sensor 215 is used by the automatic driving control module 21 to automatically control the driving of the vehicle 2, and is also sent to the server 30 through the network 5 as the information about the driving condition of the vehicle 2. The direction of the acceleration measured by the acceleration sensor 215 may be at least one specific spatial direction of the vehicle 2, and, for example, the direction of travel of the vehicle 2 or the direction of an inertial force acting on the passenger 4 when the vehicle 2 changes the direction of travel by steering wheel operation.

The external communication device 216 is an in-vehicle terminal having a wireless communication function, and is, for example, an in-vehicle navigation system or a DCM (data communication module), as described in the non-patent literature (TOYOTA MOTOR CORPORATION, Mobility Service-specific EV "e-Palette Concept" [retrieved on Aug. 31, 2018], Internet <URL: https://newsroom.toyota.co.jp/jp/corporate/20508200.html>). The external communication device 216 accesses a wireless base station (not illustrated), which is connected through the network 5, a gateway (not illustrated), and the like, whereby the external communication device 216 is connected to the network 5 through the wireless base station.

Figure 4:
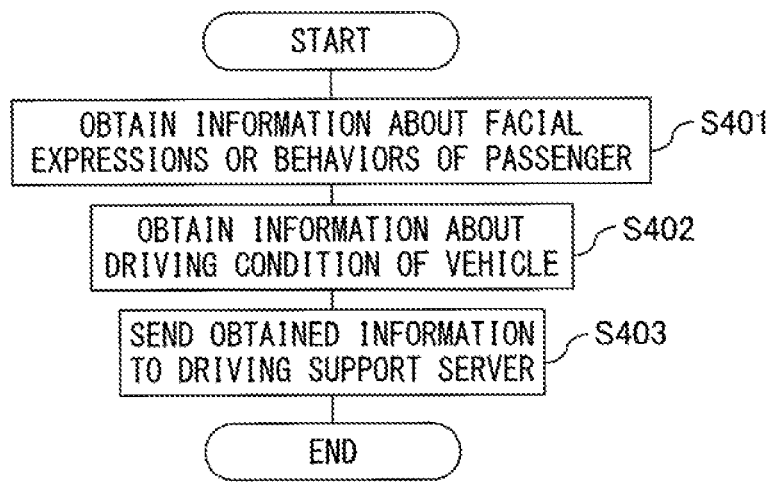
FIG. 4 is a flowchart showing an example of an information collection process used for evaluating the driving of the vehicle that is under automatic driving control, in a vehicle-mounted device according to the first embodiment.

FIG. 4 is a flowchart showing an example of an information collection process used for evaluating the driving of the vehicle 2 that is under the automatic driving control, in the vehicle-mounted device 20 according to the first embodiment. The controller 200 regularly executes the information collection process in accordance with the following flowchart. Descriptions regarding contents which are the same as the sequential diagram of FIG. 2 have been omitted.

While the vehicle 2 is automatically driven by the automatic driving control module 21, the controller 200 obtains, for example, the video of the passenger 4 captured by the in-vehicle camera 214, as the information about the facial expressions or behavior of the passenger 4 who is riding in the vehicle 2 (step S401). The controller 200 also obtains, for example, information about the acceleration of the vehicle 2 measured by the acceleration sensor 215, as the information about the driving condition of the vehicle 2 (step S402).

Thereafter, the controller 200 sends the obtained information about the facial expressions or behavior of the passenger 4 and information about the driving condition of the vehicle 2 to the server 30 through the external communication device 216 (step S403).

Figure 5:
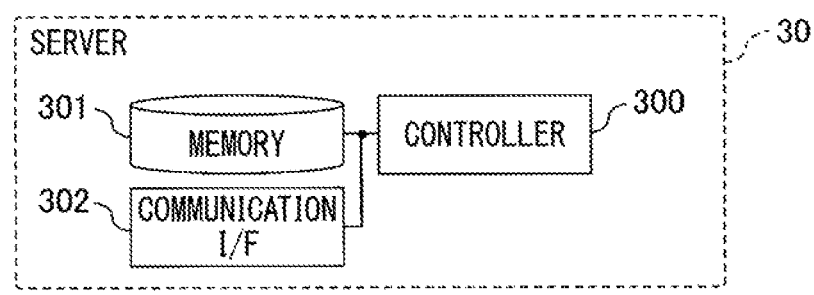
FIG. 5 is a hardware configuration diagram of a server according to the first embodiment.
Figure 6:
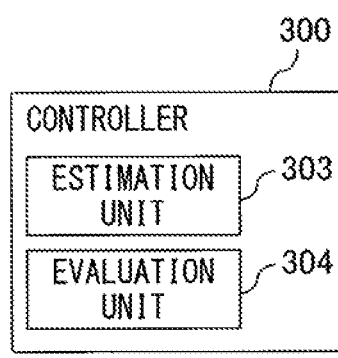
FIG. 6 is a functional block diagram of a controller of the server according to the first embodiment.

FIG. 5 is a hardware configuration diagram of the server 30 according to the first embodiment. The server 30 has a controller 300, a memory 301, and a communication I/F 302. FIG. 6 is a functional block diagram of controller 300 of the server 30 according to the first embodiment.

The controller 300 is one or more processors and peripheral circuits thereof that execute computer programs for control and calculation in the server 30. The controller 300 has an estimation unit 303 and an evaluation unit 304. The estimation unit 303 and the evaluation unit 304 are realized as, for example, a software module or firmware to which computer programs are written. Processes performed by the estimation unit 303 and the evaluation unit 304 will be described later with reference to the flowcharts of FIGS. 7 and 9.

The memory 301 has a recording medium such as an HDD (hard disk drive), an optical recording medium, or a semiconductor memory, and stores the computer programs executed by the controller 300. The memory 301 stores data that is received by the controller 300 through the network 5, data generated by the controller 300, and the like. The memory 301 stores information about the vehicle 2, information about the user 4*b* (passenger 4), and the like.

The communication I/F 302 is a communication I/F circuit for connecting the server 30 to the network 5 via, for example, a gateway or the like. The communication I/F 302 is configured to be able to communicate with the vehicle-mounted device 20 and the mobile terminal 40 through the network 5.

The estimation unit 303 of the controller 300 determines, based on the information about the facial expressions or behaviors of the one or more passengers 4 who are riding in the vehicle 2 that is under the automatic driving control, whether or not the passenger 4 has displayed a facial expression or behavior indicating a specific feeling, and estimates the ride comfort of the vehicle 2 felt by the passenger 4 in accordance with a determination result. A ride comfort estimation process performed by the estimation unit 303 will be described below.

Figure 7:
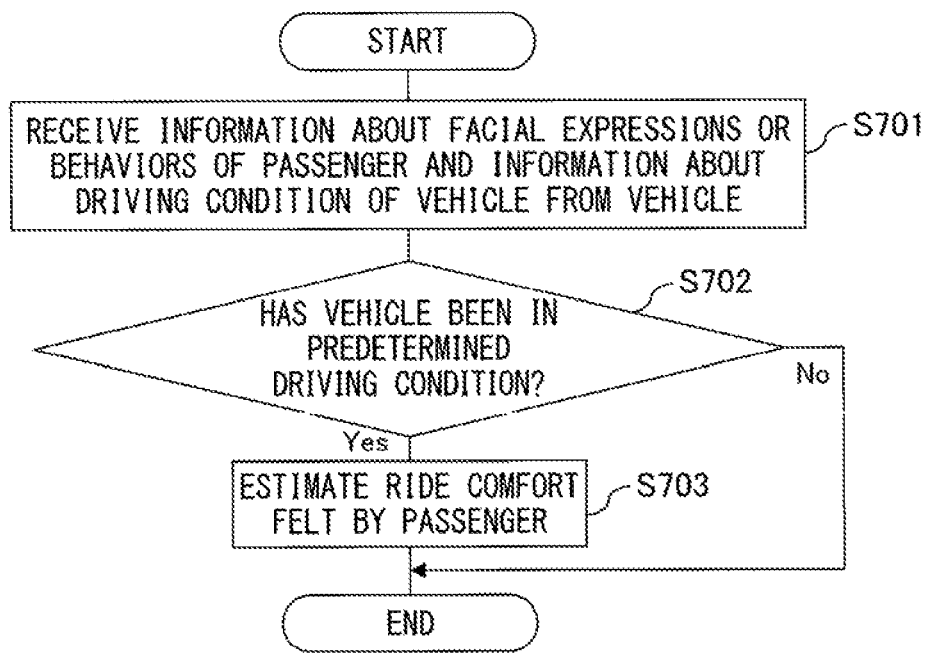
FIG. 7 is a flowchart showing an example of a ride comfort estimation process by the server according to the first embodiment.

FIG. 7 is a flowchart showing an example of the ride comfort estimation process by the server 30 according to the first embodiment. The estimation unit 303 regularly performs the ride comfort estimation process in accordance with the following flowchart. Descriptions regarding contents which are the same as the sequential diagram of FIG. 2 have been omitted.

While the vehicle 2 is automatically driven by the automatic driving control module 21, the estimation unit 303 receives the information about the facial expressions or behavior of the passenger 4 and the information about the driving condition of the vehicle 2 from the vehicle-mounted device 20 of the vehicle 2 through the communication I/F 302 (step S701).

Next, the estimation unit 303 determines whether the vehicle 2 has been in a predetermined driving condition (step S702). When the vehicle 2 has not been in the predetermined driving condition (NO in step S702), the ride comfort estimation process ends.

Conversely, when the vehicle has been in the predetermined driving condition (YES in S702), the estimation unit 303 estimates the ride comfort of the vehicle 2 felt by the passenger 4, based on the facial expressions or behavior of the passenger 4 while the vehicle 2 is in the predetermined driving condition (step S703).

Specific examples of methods for estimating the ride comfort of the vehicle 2 based on the information about the facial expressions or behavior of the passenger 4 will be described.

For example, the estimation unit 303 performs video analysis processing on the video of the passenger 4 captured by the in-vehicle camera 214, and when the passenger 4 in the video has displayed a facial expression indicating a specific feeling, e.g., surprise or the like, the estimation unit 303 estimates the ride comfort of the vehicle 2 felt by the passenger 4 as negative. Alternatively, the estimation unit 303 may performs video analysis processing on the video of the passenger 4 captured by the in-vehicle camera 214, and when the passenger 4 in the video has displayed a behavior indicating surprise, e.g., grasping a strap or handle, the estimation unit 303 estimates the ride comfort of the vehicle 2 felt by the passenger 4 as negative.

As a method for video analysis processing in which it is determined whether or not the passenger 4 has displayed a facial expression or behavior indicating a specific feeling from the video of the passenger 4, for example, machine learning techniques can be used. More specifically, the estimation unit 303 inputs each frame of the video to an estimator, which has been taught to indicate whether a person has displayed a facial expression or behavior indicating a specific feeling, such as surprise, when an image of the person is inputted. This estimator is, for example, a DNN (deep neural network). The estimation unit 303 estimates whether or not the passenger 4 has displayed a facial expression or behavior indicating the specific feeling, in accordance with a determination result from the estimator, which represents whether the passenger 4 in the frame image has displayed a facial expression or behavior indicating the specific feeling.

The estimation unit 303 may grade and estimate the ride comfort of the vehicle 2 felt by the passenger 4 into three or more estimation values, instead of estimate the ride comfort of the vehicle 2 felt by the passenger 4 in a binary manner, i.e., negative or not.

Figure 8:
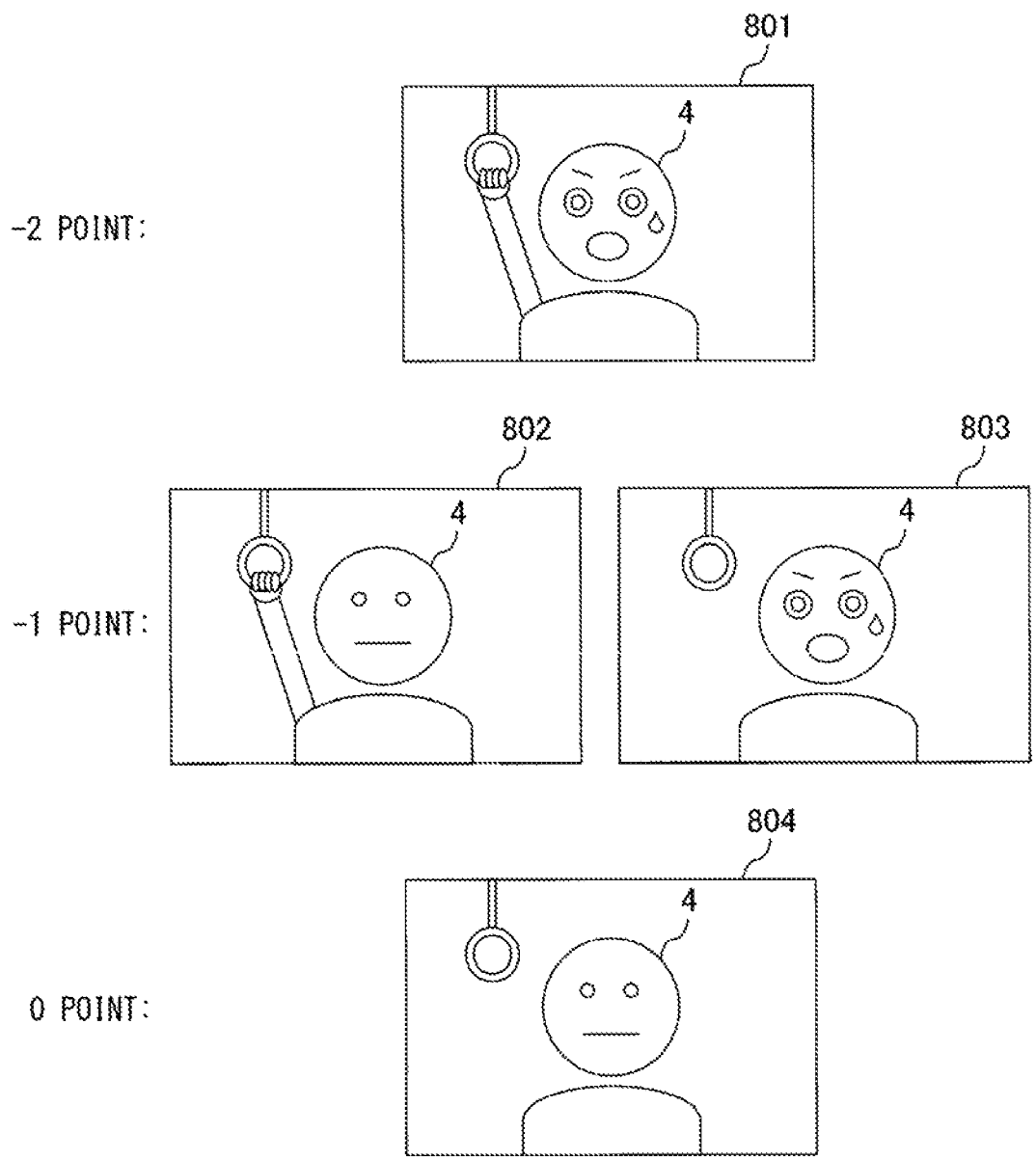
FIG. 8 is a diagram that explains the ride comfort estimation process in which ride comfort felt by a passenger is graded into three estimation values, in an estimation unit according to the first embodiment.

FIG. 8 is a diagram that explains the ride comfort estimation process in which the ride comfort of the vehicle 2 felt by the passenger 4 is graded into three estimation values, in the estimation unit 303 according to the first embodiment.

The estimation unit 303 performs the video analysis process on a frame image 801, which represents, for example, a facial expression and a behavior of the passenger 4. When the estimation unit 303 determines that the passenger 4 in the frame image 801 has displayed both a surprised facial expression and indication of surprise, e.g., grasping a strap or the like, the estimation unit 303 estimates the ride comfort of the vehicle 2 felt by the passenger 4 at "−2" (very bad).

Alternatively, the estimation unit 303 may perform the video analysis processing on another frame image 802 or 803. When the estimation unit 303 determines that the passenger 4 has displayed any one of a surprised facial expression and a surprised behavior, the estimation unit 303 estimates the ride comfort of the vehicle 2 felt by the passenger 4 at "−1" (bad). Alternatively, the estimation unit 303 may perform the video analysis processing on another frame image 804. When the estimation unit 303 determines that the passenger 4 has displayed neither a surprised expression nor a surprised behavior, the estimation unit 303 estimates the ride comfort of the vehicle 2 felt by the passenger 4 at "0" (normal).

The estimation unit 303 analyzes the video of the passenger 4 captured by the in-vehicle camera 214, and estimates the heart rate of the passenger 4 from a change in skin color and the like of the passenger 4. When the heart rate of the passenger 4 changes to a predetermined level or more, the estimation unit 303 may estimate the ride comfort of the vehicle 2 felt by the passenger 4 as negative.

When the vehicle 2 offers ride share service, if the ride comfort of the vehicle 2 is estimated as negative for a predetermined number or more of the passengers 4 riding in the vehicle 2 at the same time, the estimation unit 303 may estimate the ride comfort of the vehicle 2 as negative. "At the same time" means that the facial expressions or behaviors of the passengers 4 appear in response to the same change in the driving condition of the vehicle 2. Therefore, since the driving of the vehicle 2 is prevented from being evaluated based on a special facial expression or behavior of some of the passengers 4, in the case in which, for example, one of the passengers 4 is surprised merely by news or the like viewed on the mobile terminal 40, the accuracy of the evaluation of the driving of the vehicle 2 that is under the automatic driving control can be improvised.

The evaluation unit 304 of the controller 300 evaluates the driving of the vehicle 2 that is under the automatic driving control, based on a ride comfort estimation result. A driving evaluation process of the vehicle 2 performed by the evaluation unit 304 will be described below.

Figure 9:
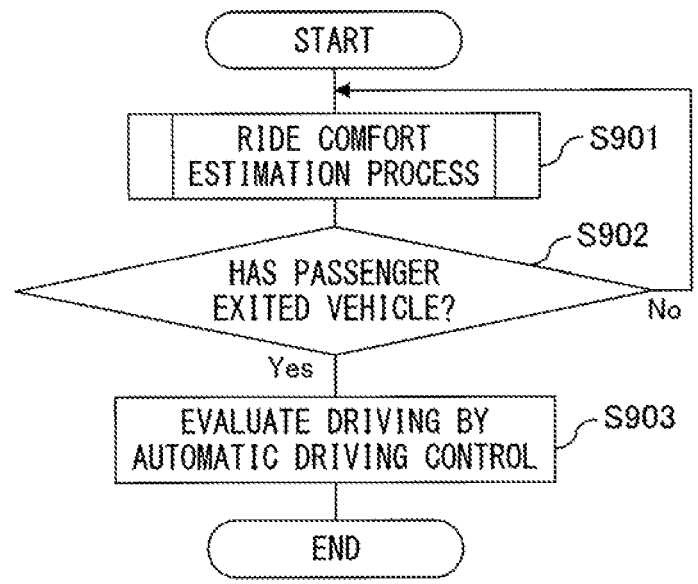
FIG. 9 is a flowchart showing an example of a driving evaluation process of the vehicle that is under automatic driving control, in the server according to the first embodiment.

FIG. 9 is a flowchart showing an example of the driving evaluation process of the vehicle 2 that is under the automatic driving control, in the server 30 according to the first embodiment. Description regarding contents which are the same as the sequential diagram of FIG. 2 have been omitted.

First, the estimation unit 303 performs the ride comfort estimation process shown in FIG. 7 (step S901).

Next, the evaluation unit 304 determines whether or not the passenger 4 has exited the vehicle 2 (step S902). When the passenger 4 has not exited the vehicle 2 (NO in step S902), the estimation unit 303 performs the ride comfort estimation process until the passenger 4 exits the vehicle 2.

Conversely, when the passenger 4 has exited the vehicle 2 (YES in step S902), the evaluation unit 304 evaluates the driving of the vehicle 2 that is under the automatic driving control, based on a ride comfort estimation result (step S903).

The evaluation unit 304 calculates an evaluation of the driving of the vehicle 2 that is under the automatic driving control, in accordance with the number of times the ride comfort of the vehicle 2 has been estimated as negative, by, for example, deducting the number of times the ride comfort of the vehicle 2 has been estimated as negative from a predetermined initial score. Alternatively, the evaluation unit 304 may calculate an evaluation of the driving of the vehicle 2 that is under the automatic driving control, in accordance with ride comfort estimation values that are graded into three or more estimation values, by, for example, deducting a total of the absolute values of the graded ride comfort estimation values from a predetermined initial score. The evaluation unit 304 then ends the driving evaluation process of the vehicle 2.

Information about the driving evaluation calculated by the evaluation unit 304 is stored in the memory 301, or sent to another server through the communication I/F 302, for use as evaluation information to update the performance and function of the automatic driving control module 21.

The evaluation unit 304 may store the driving evaluation result of the vehicle 2 by the automatic driving control module 21, which is configured to be updatable, and information about the type or version of the automatic driving control module 21 in the memory 301 in association with each other. Therefore, the driving of the vehicle 2 that is under the automatic driving control by the automatic driving control module 21 is evaluated on a type-by-type or version-by-version basis of the automatic driving control module 21, so the performance and function of the automatic driving control module 21 can be easily updated.

As described above, the server according to the present embodiment receives, from the vehicle, information about the facial expressions or behaviors of the one or more passengers who are riding in the vehicle that is under the automatic driving control. The server determines whether or not the passenger has displayed a facial expression or behavior indicating a specific feeling, based on the received information about the facial expressions or behavior of the passenger, and estimates the ride comfort of the vehicle felt by the passenger in accordance with a determination result. The server evaluates the driving of the vehicle that is under the automatic driving control, based on a ride comfort estimation result.

Therefore, a server, driving evaluation system, driving evaluation method, and computer program that can automatically and appropriately evaluate the driving of the vehicle that is under the automatic driving control, based on the ride comfort of the vehicle actually felt by the passenger, without burdening the busy passengers can be provided.

Figure 10:
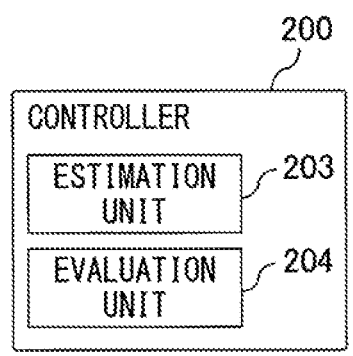
FIG. 10 is a functional block diagram of a control unit of a vehicle-mounted device according to a second embodiment.

[Second Embodiment] FIG. 10 is a functional block diagram of a controller 200 of a vehicle-mounted device 20 according to a second embodiment. The vehicle-mounted device 20 according to the present embodiment is merely an example of the driving evaluation apparatus, and the controller 200 of the vehicle-mounted device 20 has an estimation unit 203 and an evaluation unit 204. The estimation unit 203 and the evaluation unit 204 have the same functions as the estimation unit 303 of the evaluation unit 304 of the server 30, respectively. The other components are identical to those of the first embodiment, so only differences from the first embodiment will be described below.

The estimation unit 203 and evaluation unit 204 of the controller 200 are realized as, for example, a software module or firmware to which computer programs are written. Processes performed by the estimation unit 203 and evaluation unit 204 will be described later with reference to the flowcharts of FIGS. 11 and 12.

The estimation unit 203 and evaluation unit 204 of the present embodiment can evaluate the driving of the vehicle 2 that is under automatic driving control by themselves, without being supported by the server 30. Therefore, for example, even in a case in which communication between the server 30 and the vehicle-mounted device 20 through the network 5 is disconnected, the estimation unit 203 and evaluation unit 204 of the vehicle-mounted device 20 can perform the driving evaluation process of the vehicle 2.

The estimation unit 203 of the controller 200 determines, based on information about facial expressions or behaviors of one or more passengers 4 who are riding in the vehicle that is under the automatic driving control, whether or not the passenger 4 has displayed a facial expression or behavior indicating a specific feeling, and estimates ride comfort of the vehicle 2 felt by the passenger 4 in accordance with a determination result. The ride comfort estimation process performed by the estimation unit 203 will be described below.

Figure 11:
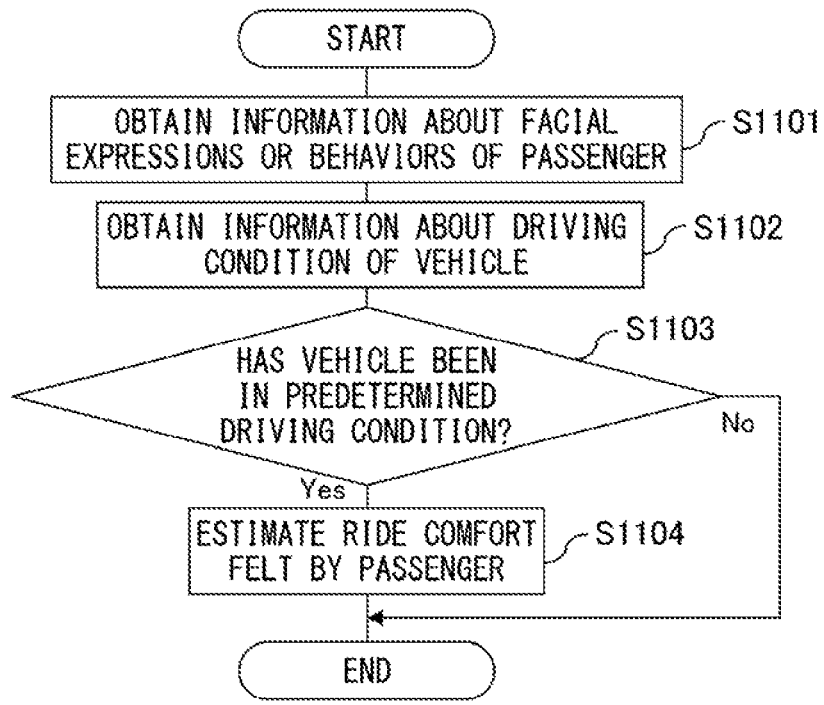
FIG. 11 is a flowchart showing an example of a ride comfort estimation process in the vehicle-mounted device according to the second embodiment.

FIG. 11 is a flowchart showing an example of the ride comfort estimation process in the vehicle-mounted device 20 according to the second embodiment. The estimation unit 203 regularly performs the ride comfort estimation process in accordance with the following flowchart. Steps S1101 and S1102 are the same as steps S401 and S402 of FIG. 4, and thus, descriptions thereof have been omitted.

The estimation unit 203 determines whether or not the vehicle 2 has been in a predetermined driving condition (step S1103). When the vehicle 2 has not been in the predetermined driving condition (NO in step S1103), the estimation unit 203 ends the ride comfort estimation process.

Conversely, when the vehicle 2 has been in the predetermined driving condition (YES in step S1103), the estimation unit 203 estimates ride comfort of the vehicle 2 felt by a passenger 4 based on the facial expressions or behavior of the passenger 4 while the vehicle 2 is in the predetermined driving condition (step S1104).

The evaluation unit 204 of the controller 200 evaluates the driving of the vehicle 2 that is under automatic driving control, based on a ride comfort estimation result. A driving evaluation process of the vehicle 2 performed by the evaluation unit 204 will be described below.

Figure 12:
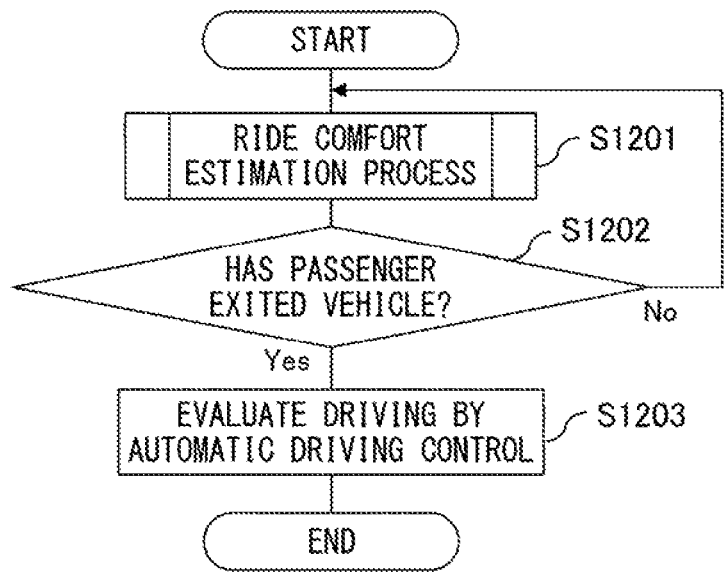
FIG. 12 is a flowchart showing an example of a driving evaluation process of a vehicle that is under automatic driving control, in the vehicle-mounted device according to the second embodiment.

FIG. 12 is a flowchart showing an example of the driving evaluation process of the vehicle 2 that is under the automatic driving control, in the vehicle-mounted device 20 according to the second embodiment.

First, the estimation unit 203 performs the ride comfort estimation process shown in FIG. 11 (step S1201).

Next, the evaluation unit 204 determines whether or not the passenger 4 has exited the vehicle 2 (step S1202). When the passenger 4 has not exited the vehicle 2 (NO in step S1202), the estimation unit 203 performs the ride comfort estimation process until the passenger 4 exits the vehicle 2.

Conversely, when the passenger 4 has exited the vehicle 2 (YES in step S1202), the evaluation unit 204 evaluates the driving of the vehicle 2 that is under the automatic driving control, based on the ride comfort estimation result (step S1203). The evaluation unit 204 then ends the driving evaluation process of the vehicle 2.

As described above, the vehicle-mounted device according to the present embodiment collects information about the facial expressions or behaviors of one or more passengers who are riding in the vehicle that is under the automatic driving control. The vehicle-mounted device determines whether or not the passenger has displayed a facial expression or behavior indicating a specific feeling, based on the received information about the facial expressions or behavior of the passenger, and estimates the ride comfort of the vehicle felt by the passenger in accordance with a determination result. The vehicle-mounted device evaluates the driving of the vehicle that is under the automatic driving control, based on a ride comfort estimation result.

Therefore, a vehicle-mounted device, driving evaluation method, and computer program that can automatically and appropriately evaluate the driving of the vehicle that is under the automatic driving control, based on the ride comfort of the vehicle actually felt by the passenger, without burdening the busy passengers can be provided.

The above embodiments are merely examples for carrying out the present invention, and the technical scope of the present invention is not limited by the embodiments. In other words, the present invention can be carried out in various forms without deviating from the technical principles or main features thereof.

For example, the components of the above embodiments can be used in combination. For example, the estimation unit 203 and evaluation unit 204 of the vehicle-mounted device 20 of the vehicle 2 and the estimation unit 303 and evaluation unit 304 of the server 30 may collaboratively evaluate the driving of the vehicle 2. For example, the estimation unit 203 of the vehicle-mounted device 20 may estimate the ride comfort of the vehicle 2 felt by the passenger 4 based on the information about the facial expressions or behavior of the passenger 4, and the evaluation unit 304 of the server 30 may evaluate the driving of the vehicle 2 based on the estimated ride comfort.

To avoid a person or object that has rushed out into the road, or to avoid a collision with a vehicle ahead, the automatic driving control module 21 may sometimes suddenly operate the accelerator, brake, or steering wheel. However, even if the vehicle 2 comes to be in a predetermined driving condition as a result, such automatic driving control is unavoidable, and thus, does not necessarily indicate low performance of function of the automatic driving control module 21.

Accordingly, in a case where the vehicle 2 has come to be in the predetermined driving condition, as a result of the automatic driving control to avoid danger, the estimation unit may not estimate the ride comfort of the vehicle 2 felt by the passenger 4 based on the facial expressions or behavior of the passenger 4. In this case, information about whether or not the automatic driving control has been performed to avoid danger is sent from the automatic driving control module 21 to the server 30. Therefore, it is possible to improve accuracy in evaluation of the driving of the vehicle 2 that is under the automatic driving control.

According to another modification example, the estimation unit may perform a voice recognition process on the voice of the passenger 4 recorded by a sound collector such as, for example, the vehicle-mounted microphone. When the voice includes any of predetermined phrases representing behaviors indicating specific feelings, the estimation unit may estimate the ride comfort as negative. The predetermined phrases may be, for example, "be careful", "I am surprised", and the like. This improves accuracy in evaluation of the driving of the vehicle 2 that is under the automatic driving control. In this case, the vehicle-mounted microphone is disposed on, for example, the ceiling in front of the seat on which the passenger 4 is sitting, the rear surface of the seat in front of the passenger's seat, or the like, in order to clearly capture the voice of the riding passenger 4.

Alternatively, the estimation unit may, more simply, calculate the strength of voice, while the vehicle 2 is in a predetermined driving condition, in each frame of a predetermined length. When the strength of the voice exceeds a predetermined threshold value, the estimation unit may estimate the ride comfort of the vehicle 2 felt by the passenger 4 as negative.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A driving evaluation apparatus comprising a processor configured to:
   in response to receiving information about facial expressions or behaviors of one or more passengers riding in a vehicle that is under automatic driving control, determine whether or not the passenger has displayed a facial expression or behavior indicating a specific feeling,
   in response to determining that the passenger has displayed the facial expression or behavior indicating the specific feeling, estimate a ride comfort of the vehicle felt by the passenger is negative in accordance with determining that the passenger has displayed the facial expression or behavior indicating the specific feeling, and
   evaluate the driving of the vehicle that is under the automatic driving control based on a number of times the ride comfort of the vehicle is estimated to be negative.

2. The driving evaluation apparatus according to claim 1, wherein the processor estimates the ride comfort of the vehicle felt by the passenger, based on the facial expressions or behavior of the passenger when an absolute value of acceleration, velocity, or angular velocity of the vehicle exceeds a predetermined threshold value.

3. The driving evaluation apparatus according to claim 2, wherein the processor does not estimate the ride comfort of the vehicle felt by the passenger, based on the facial expressions or behavior of the passenger when the absolute value of the acceleration, velocity, or angular velocity of the vehicle exceeds the predetermined threshold value as a result of the automatic driving control to avoid danger.

4. The driving evaluation apparatus according to claim 1, wherein
   the information about the facial expressions or behavior of the passenger is a video of the passenger captured by an imaging device of the vehicle when an absolute value of acceleration, velocity, or angular velocity of the vehicle exceeds a predetermined threshold value, and
   when the processor determines that the passenger in the video has displayed the facial expression or behavior indicating the specific feeling, the processor estimates the ride comfort of the vehicle felt by the passenger as negative.

5. The driving evaluation apparatus according to claim 1, wherein
the information about the facial expressions or behavior of the passenger is a voice of the passenger recorded by a sound collector of the vehicle when an absolute value of acceleration, velocity, or angular velocity of the vehicle exceeds a predetermined threshold value, and
when the voice includes a predetermined phrase representing the behavior indicating the specific feeling, or when a strength of the voice exceeds a predetermined threshold value, the processor estimates the ride comfort of the vehicle felt by the passenger as negative.

6. The driving evaluation apparatus according to claim 1, wherein when the ride comfort of the vehicle is estimated as negative for a predetermined number or more of the passengers riding in the vehicle, the processor estimates the ride comfort of the vehicle as negative.

7. The driving evaluation apparatus according to claim 1, further comprising:
a memory, wherein
the processor stores the evaluation result of the driving of the vehicle by an automatic driving control module which is installed in the vehicle and which has automatic driving control over the vehicle, and information about a type or version of the automatic driving control module, in the memory in association with each other.

8. A driving evaluation apparatus comprising a processor configured to:
in response to receiving information about facial expressions or behaviors of one or more passengers riding in a vehicle that is under automatic driving control, determine whether or not the passenger has displayed a facial expression or behavior indicating a specific feeling,
in response to determining that the passenger has displayed the facial expression or behavior indicating the specific feeling, estimate a ride comfort of the vehicle felt by the passenger in accordance with determining that the passenger has displayed the facial expression or behavior indicating the specific feeling; and
evaluate the driving of the vehicle that is under the automatic driving control, based on the estimated ride comfort,
wherein the driving evaluation apparatus is configured as a server that receives the information about the facial expressions or behavior of the passenger from the vehicle in which a capture device for capturing the information about the facial expressions or behavior of the passenger is installed, through a network, or configured as a vehicle-mounted device installed in the vehicle, together with a capture device for capturing the information about the facial expressions or behavior of the passenger.

9. The driving evaluation apparatus according to claim 8, wherein the processor estimates the ride comfort of the vehicle felt by the passenger based on the facial expressions or behavior of the passenger when an absolute value of acceleration, velocity, or angular velocity of the vehicle exceeds a predetermined threshold value.

10. The driving evaluation apparatus according to claim 9, wherein the processor does not estimate the ride comfort of the vehicle felt by the passenger based on the facial expressions or behavior of the passenger when the absolute value of the acceleration, velocity, or angular velocity of the vehicle exceeds the predetermined threshold value as a result of the automatic driving control to avoid danger.

11. The driving evaluation apparatus according to claim 8, wherein
whenever the processor receives the information about the facial expressions or behavior of the passenger, the processor determines whether or not the passenger has displayed the facial expression or behavior indicating the specific feeling based on the received information, and when the processor determines that the passenger has displayed the facial expression or behavior indicating the specific feeling, the processor estimates the ride comfort of the vehicle felt by the passenger as negative, and
the processor evaluates the driving of the vehicle that is under the automatic driving control, based on a number of times the ride comfort of the vehicle is estimated as negative.

12. The driving evaluation apparatus according to claim 11, wherein
the information about the facial expressions or behavior of the passenger is a video of the passenger captured by an imaging device of the vehicle when an absolute value of acceleration, velocity, or angular velocity of the vehicle exceeds a predetermined threshold value, and
when the processor determines that the passenger in the video has displayed the facial expression or behavior indicating the specific feeling, the processor estimates the ride comfort of the vehicle felt by the passenger as negative.

13. The driving evaluation apparatus according to claim 11, wherein
the information about the facial expressions or behavior of the passenger is a voice of the passenger recorded by a sound collector of the vehicle when an absolute value of acceleration, velocity, or angular velocity of the vehicle exceeds a predetermined threshold value, and
when the voice includes a predetermined phrase representing a behavior indicating the specific feeling, or when a strength of the voice exceeds a predetermined threshold value, the processor estimates the ride comfort of the vehicle felt by the passenger as negative.

14. The driving evaluation apparatus according to claim 11, wherein when the ride comfort of the vehicle is estimated as negative for a predetermined number or more of the passengers riding in the vehicle, the processor estimates the ride comfort of the vehicle as negative.

15. The driving evaluation apparatus according to claim 8, further comprising:
a memory, wherein
the processor stores the evaluation result of the driving of the vehicle by an automatic driving control module which is installed in the vehicle and which has automatic driving control over the vehicle, and information about a type or version of the automatic driving control module, in the memory in association with each other.

16. A driving evaluation method comprising the steps of:
determining, in response to receiving information about facial expressions or behaviors of one or more passengers riding in a vehicle that is under automatic driving control, whether or not the passenger has displayed a facial expression or behavior indicating a specific feeling, and
estimating, in response to determining that the passenger has displayed the facial expression or behavior indicating the specific feeling, a ride comfort of the vehicle felt by the passenger is negative in accordance with determining that the passenger has displayed the facial expression or behavior indicating a specific feeling; and evaluating the driving of the vehicle that is under the automatic driving control based on a number of times the ride comfort of the vehicle is determined to be negative.

\* \* \* \* \*